(12) United States Patent
Sadamasa et al.

(10) Patent No.: US 8,301,435 B2
(45) Date of Patent: Oct. 30, 2012

(54) REMOVING AMBIGUITY WHEN ANALYZING A SENTENCE WITH A WORD HAVING MULTIPLE MEANINGS

(75) Inventors: Kunihiko Sadamasa, Tokyo (JP); Shinichi Ando, Tokyo (JP); Shinichi Doi, Tokyo (JP)

(73) Assignee: NEC Corporation, Tokyo (JP)

( * ) Notice: Subject to any disclaimer, the term of this patent is extended or adjusted under 35 U.S.C. 154(b) by 1068 days.

(21) Appl. No.: 12/280,839

(22) PCT Filed: Feb. 9, 2007

(86) PCT No.: PCT/JP2007/052319
§ 371 (c)(1),
(2), (4) Date: Aug. 27, 2008

(87) PCT Pub. No.: WO2007/097208
PCT Pub. Date: Aug. 30, 2007

(65) Prior Publication Data
US 2009/0018821 A1    Jan. 15, 2009

(30) Foreign Application Priority Data
Feb. 27, 2006 (JP) .................................. 2006-050450

(51) Int. Cl.
*G06F 17/28* (2006.01)
(52) U.S. Cl. ............... 704/2; 704/3; 704/4; 704/5; 704/7
(58) Field of Classification Search ................. 704/1–10
See application file for complete search history.

(56) References Cited

U.S. PATENT DOCUMENTS

| | | | |
|---|---|---|---|
| 6,965,857 B1 * | 11/2005 | Decary | 704/9 |
| 7,027,974 B1 * | 4/2006 | Busch et al. | 704/4 |
| 7,899,666 B2 * | 3/2011 | Varone | 704/9 |
| 2002/0042707 A1 * | 4/2002 | Zhao et al. | 704/9 |
| 2003/0036900 A1 * | 2/2003 | Weise | 704/9 |
| 2003/0158723 A1 * | 8/2003 | Masuichi et al. | 704/4 |
| 2004/0122658 A1 * | 6/2004 | Lamping et al. | 704/9 |
| 2004/0167771 A1 * | 8/2004 | Duan et al. | 704/10 |

FOREIGN PATENT DOCUMENTS

JP 02-051772 2/1990
(Continued)

OTHER PUBLICATIONS

Collins et al. "Discriminative Reranking for Natural Language Parsing", Computational Linguistics, 2005—MIT Press.*
Charniak, "Statistical Techniques for Natural Language Parsing", AI Magazine vol. 18 No. 4, 1997.*
Ratnaparkhi, "Learning to Parse Natural Language with Maximum Entropy Models", Machine Learning 34, 151-175, Kluwer Academic Publishers.,1999.*

(Continued)

*Primary Examiner* — Jialong He
(74) *Attorney, Agent, or Firm* — Young & Thompson

(57) ABSTRACT

A language processing device includes first analysis unit 21 that subjects a natural language sentence containing a polysemic word and other words to a predetermined analysis and outputs a plurality of analysis results for the natural language sentence according to a plurality of meanings of the polysemic word, second analysis unit 23 that performs a particular analysis on the analysis results outputted from first analysis unit 21, and employs one of the analysis results, and generation unit 244 that generates a deletion rule for deleting one or more unnecessary analysis results of the first analysis unit 21 which has been deleted from the analysis results outputted from first analysis unit 21 but employed by second analysis unit 23, according to the analysis results outputted from the first analysis unit 21 and the employment result of second analysis unit 23.

6 Claims, 5 Drawing Sheets

FOREIGN PATENT DOCUMENTS

| | | |
|---|---|---|
| JP | 02-114377 | 4/1990 |
| JP | 06-295308 | 10/1994 |
| JP | 08-016596 | 1/1996 |
| JP | 08-036575 | 2/1996 |
| JP | 08-235188 | 9/1996 |
| JP | 09-198386 | 7/1997 |
| JP | 2005-182438 | 7/2005 |

OTHER PUBLICATIONS

Shin' ichi Doi et al., "Goi Bunmyaku Bunpo (Lexical Disclosure Grammar) to Sono Taikyokuteki Kakariuke Ketter eno Oyo (II)", IEICE Technocal Report, Oct. 24, 1991, vol. 91, No. 297, pp. 17 to 24.

* cited by examiner

Fig. 3A

| PRECEDING WORD | | WORD HAVING AMBIGUITY | | SUBSEQUENT WORD | | EMPLOYMENT/ UNEMPLOYMENT INFORMATION |
|---|---|---|---|---|---|---|
| SURFACE STRING | WORD CLASS | SURFACE STRING | WORD CLASS | SURFACE STRING | WORD CLASS | |
| GA | POSTPOSITIONAL WORD FUNCTIONING AS AUXILIARY TO MAIN WORD | TOKERU | VERB | TO | REFERENCE POSTPOSITIONAL WORD FUNCTIONING AS AUXILIARY TO MAIN WORD | EMPLOYED |
| GA | POSTPOSITIONAL WORD FUNCTIONING AS AUXILIARY TO MAIN WORD | TOKERU | POSSIBLE VERB | TO | REFERENCE POSTPOSITIONAL WORD FUNCTIONING AS AUXILIARY TO MAIN WORD | EMPLOYED |
| GA | POSTPOSITIONAL WORD FUNCTIONING AS AUXILIARY TO MAIN WORD | TOKERU | VERB | TO | CONNECTION POSTPOSITIONAL WORD FUNCTIONING AS AUXILIARY TO MAIN WORD | EMPLOYED |
| GA | POSTPOSITIONAL WORD FUNCTIONING AS AUXILIARY TO MAIN WORD | TOKERU | POSSIBLE VERB | TO | CONNECTION POSTPOSITIONAL WORD FUNCTIONING AS AUXILIARY TO MAIN WORD | EMPLOYED |
| WO | POSTPOSITIONAL WORD FUNCTIONING AS AUXILIARY TO MAIN WORD | TOKERU | POSSIBLE VERB | TO | REFERENCE POSTPOSITIONAL WORD FUNCTIONING AS AUXILIARY TO MAIN WORD | EMPLOYED |
| WO | POSTPOSITIONAL WORD FUNCTIONING AS AUXILIARY TO MAIN WORD | TOKERU | POSSIBLE VERB | TO | CONNECTION POSTPOSITIONAL WORD FUNCTIONING AS AUXILIARY TO MAIN WORD | EMPLOYED |
| ― | VERB | TO | REFERENCE POSTPOSITIONAL WORD FUNCTIONING AS AUXILIARY TO MAIN WORD | ― | NOUN | EMPLOYED |
| ― | POSSIBLE VERB | TO | REFERENCE POSTPOSITIONAL WORD FUNCTIONING AS AUXILIARY TO MAIN WORD | ― | NOUN | EMPLOYED |
| ― | VERB | TO | CONNECTION POSTPOSITIONAL WORD FUNCTIONING AS AUXILIARY TO MAIN WORD | ― | NOUN | EMPLOYED |
| ― | POSSIBLE VERB | TO | CONNECTION POSTPOSITIONAL WORD FUNCTIONING AS AUXILIARY TO MAIN WORD | ― | NOUN | EMPLOYED |
| ⋮ | | ⋮ | | ⋮ | | |

Fig. 3C

| PRECEDING WORD | | WORD HAVING AMBIGUITY | | SUBSEQUENT WORD | | EMPLOYMENT/ UNEMPLOYMENT INFORMATION |
|---|---|---|---|---|---|---|
| SURFACE STRING | WORD CLASS | SURFACE STRING | WORD CLASS | SURFACE STRING | WORD CLASS | |
| WO | POSTPOSITIONAL WORD FUNCTIONING AS AUXILIARY TO MAIN WORD | TOKERU | VERB | TO | REFERENCE POSTPOSITIONAL WORD FUNCTIONING AS AUXILIARY TO MAIN WORD | NOT EMPLOYED |
| WO | POSTPOSITIONAL WORD FUNCTIONING AS AUXILIARY TO MAIN WORD | TOKERU | POSSIBLE VERB | TO | REFERENCE POSTPOSITIONAL WORD FUNCTIONING AS AUXILIARY TO MAIN WORD | EMPLOYED |
| GA | POSTPOSITIONAL WORD FUNCTIONING AS AUXILIARY TO MAIN WORD | TOKERU | VERB | TO | REFERENCE POSTPOSITIONAL WORD FUNCTIONING AS AUXILIARY TO MAIN WORD | EMPLOYED |
| GA | POSTPOSITIONAL WORD FUNCTIONING AS AUXILIARY TO MAIN WORD | TOKERU | POSSIBLE VERB | TO | REFERENCE POSTPOSITIONAL WORD FUNCTIONING AS AUXILIARY TO MAIN WORD | NOT EMPLOYED (CONTRADICTION) |
| GA | POSTPOSITIONAL WORD FUNCTIONING AS AUXILIARY TO MAIN WORD | TOKERU | VERB | TO | REFERENCE POSTPOSITIONAL WORD FUNCTIONING AS AUXILIARY TO MAIN WORD | NOT EMPLOYED (CONTRADICTION) |
| GA | POSTPOSITIONAL WORD FUNCTIONING AS AUXILIARY TO MAIN WORD | TOKERU | POSSIBLE VERB | TO | REFERENCE POSTPOSITIONAL WORD FUNCTIONING AS AUXILIARY TO MAIN WORD | EMPLOYED |
| — | POSSIBLE VERB | TO | REFERENCE POSTPOSITIONAL WORD FUNCTIONING AS AUXILIARY TO MAIN WORD | — | NOUN | EMPLOYED |
| — | POSSIBLE VERB | TO | CONNECTION POSTPOSITIONAL WORD FUNCTIONING AS AUXILIARY TO MAIN WORD | — | NOUN | NOT EMPLOYED (CONTRADICTION) |
| — | VERB | TO | REFERENCE POSTPOSITIONAL WORD FUNCTIONING AS AUXILIARY TO MAIN WORD | — | NOUN | NOT EMPLOYED (CONTRADICTION) |
| — | VERB | TO | CONNECTION POSTPOSITIONAL WORD FUNCTIONING AS AUXILIARY TO MAIN WORD | — | NOUN | EMPLOYED |
| — | POSSIBLE VERB | TO | REFERENCE POSTPOSITIONAL WORD FUNCTIONING AS AUXILIARY TO MAIN WORD | — | NOUN | NOT EMPLOYED (CONTRADICTION) |
| — | POSSIBLE VERB | TO | CONNECTION POSTPOSITIONAL WORD FUNCTIONING AS AUXILIARY TO MAIN WORD | — | NOUN | EMPLOYED |

REMOVING AMBIGUITY WHEN ANALYZING A SENTENCE WITH A WORD HAVING MULTIPLE MEANINGS

TECHNICAL FIELD

The present invention relates to a language processing device, a language processing method, and a language processing program for performing a morphological analysis or a syntactic analysis and the like in natural language processing, and more particularly, to a language processing device, a language processing method, and a language processing program which can delete an ambiguity in the middle of analysis to perform analysis processing at high speeds without changing the underlying analysis results of language analysis processing.

BACKGROUND ART

In natural language processing represented by machine translation, text mining and the like, syntactic analysis processing for analyzing an input sentence is important.

In the syntactic analysis processing, a sequence of processing is performed on an input sentence, such as (1) dividing the sentence into words, (2) giving a word class to each word, (3) determining interrelationship among the words, and (4) giving semantic information to the words.

However, since a grammatical element of a natural language such as a word, a phrase and the like can have a plurality of grammatical functions such as a plurality of meanings, a plurality of word classes and the like, the grammatical element per se can have an ambiguity with a plurality of meanings provided thereby, rather than be identified as having a single meaning.

For this reason, in the syntactic analysis processing, an analysis is made in consideration of the ambiguity of grammatical elements.

Specifically, a language processing device performs an analysis as follows when the language processing device analyzes a sentence which includes a grammatical element, which has grammatical functions such as a plurality of meanings or a plurality of word classes and the like, such as a word or a phrase and the like (hereinafter called the "polysemic word").

First, the language processing device creates a plurality of candidates in accordance with a plurality of grammatical functions (hereinafter called "a plurality of meanings") possessed by a polysemic word. Subsequently, the language processing device analyzes a plurality of these candidates to output a single analysis result.

Accordingly, the language processing device takes an immense amount of time for the syntactic analysis processing when the language processing device analyzes a sentence which includes a polysemic word.

Many methods have been conventionally proposed for processing a syntactic analysis at higher speeds. For example, there is a method of speeding processing by deleting at earlier stages unnecessary candidates which can be deleted without changing the syntactic analysis result.

As a method of creating rules for identifying such unnecessary candidates, there has been conventionally proposed a method of manually enumerating the rules in advance, but manual data creation is not realistic because this is costly.

On the other hand, Patent Document 1 (JP-2-114377-A) describes a natural language processing device which learns ambiguity elimination models (rules) in accordance with instances in analysis results of syntactic analysis processing.

Specifically, Patent Document 1 describes a natural language processing device which learns a model for eliminating an ambiguity of a word class from an analysis result of syntactic analysis processing.

This conventional natural language processing device comprises a morphological analysis unit, a syntactic analysis unit, a learning device, and a learning result holding unit. The conventional natural language processing device having such a configuration operates in the following manner.

The morphological analysis unit morphemically analyzes an input sentence. The syntactic analysis unit syntactically analyzes based on the result of the morphological analysis. The learning device receives a word class sequence having an ambiguity, which is outputted by the morphologic analysis unit, and a word class sequence, which is determined on the basis of the result of the analysis in the syntactic analysis unit, to learn a statistical model for estimating a word class. The learning result holding unit holds the result learned in the learning device. In the next analysis processing, the syntactic analysis unit estimates a word class making use of a learned result in the learning result holding unit to eliminate an ambiguity of the word class sequence at earlier stages.

Patent Document 1: JP-2-114377-A

DISCLOSURE OF THE INVENTION

Problems to be Solved by the Invention

The conventional natural language processing device that is described in Patent Document 1 estimates a word class in order to eliminate an ambiguity, but in this event, has possibilities to perform erroneous word class estimation. Thus, if the conventional natural language processing device performs erroneous word class estimation, the device can output a syntactic analysis result that is different from a syntactic analysis result when the ambiguity is not eliminated.

For this reason, the conventional natural language processing device cannot achieve the object of deleting only unnecessary candidates which do not change the syntactic analysis result.

In this regard, a reason, why the conventional natural language processing device generates erroneous word class estimations, is that although there are candidates which cannot be essentially deleted, a most likelihood estimation is made for estimating the most likely solution (candidate) without considering the existence of the candidates in a statistical model.

Consider, for example, two expressions: "hashiru/to/kare/ha/iu" (Expression 1) and "hashiru/to/kare/ha/tukareru" (Expression 2). Here, the symbol "slash" within the expressions represents a delimiter between words.

Here, word "to" has two grammatical functions (meanings), i.e., two candidates which are a "reference postpositional word functioning as an auxiliary to a main word" which represents that a phrase immediately before is a reference expression, and a "connection postpositional word functioning as an auxiliary to a main word" which represents a transition of time. Accordingly, the word "to" has an ambiguity.

Which candidate is the correct solution is often determined by whether or not a verb, which can accept a reference expression, exists at the back of "to,"

In the aforementioned example, in Expression 1, the "reference postpositional word functioning as an auxiliary to a main word" is a correct solution because there is a verb which accepts the reference expression "iu," whereas in Expression 2, the "connection postpositional word functioning as an auxiliary to a main word" is a correct solution because there is no pertinent verb.

However, when learning is performed only with observation on the word class, as in the conventional natural language processing device, both Expressions 1 and 2 have the same information which can be referenced during learning, i.e., "verb/to/noun/positional word functioning as an auxiliary to a main word/verb." For this reason, word class estimations in Expressions 1 and 2 cannot essentially lead to different results.

When such contradictory data is used as learning data, in statistical learning of most likelihood estimation, a model, which estimates a more frequent word class within the learning data as a word class of a word, is generally learned.

For example, when the frequency of a "connection postpositional word functioning as an auxiliary to a main word" is higher than the frequency of a "reference postpositional word functioning as an auxiliary to a main word," ambiguity deletion processing, when applied to an analysis on Expression 1, deletes a "reference postpositional word functioning as an auxiliary to a main word" which is less frequent but is an essential correct solution, and as a result output a syntactic analysis result which is different from the original syntactic analysis result.

Such a contradiction within learning data occurs not only when the word class alone is referenced during learning but also in overall statistical model learning.

In the statistical model learning, in order to prevent data sparseness, referenced information is limited to a finite space, so that a contradiction occurs in learning data in a similar manner with respect to an example which cannot eliminate an ambiguity unless information outside the space is used.

It is an object of the present invention to provide a language processing device, a language repair method, and a language processing program which are capable of removing only unnecessary candidates which do not change a final analysis result, and a language processing device, a language repair method, and a language processing program which are capable of performing analysis processing at higher speed without changing an analysis result by removing only the unnecessary candidates.

Means for Solving the Problem

To achieve the above object, a language processing device according to the present invention includes a first analysis unit that performs a predetermined analysis on a natural language sentence including a polysemic word and other words to output a plurality of analysis results for the natural language sentence in accordance with a plurality of meanings possessed by the polysemic word, a second analysis unit that performs a particular analysis on the plurality of analysis results outputted by the first analysis unit to adopt one analysis result of the plurality of analysis results, and a generation unit that generates a deletion rule for deleting one or more unnecessary analysis results of the first analysis unit such that even if the one or more unnecessary analysis results are deleted from the plurality of analysis results outputted by the first analysis unit, the analysis result adopted by the second analysis unit is maintained, based on the plurality of analysis results outputted by the first analysis unit and an adopted result by the second analysis unit.

Also, a language processing method according to the present invention includes a first analysis step of performing a predetermined analysis on a natural language sentence including a polysemic word and other words to output a plurality of analysis results for the natural language sentence in accordance with a plurality of meanings possessed by the polysemic word, a second analysis step of performing a particular analysis on the plurality of analysis results to adopt one analysis result of the plurality of analysis results, and a generation step of generating a deletion rule for deleting one or more unnecessary analysis results of the first analysis step such that even if the one or more unnecessary analysis results are deleted from the plurality of analysis results, the analysis result adopted by the second analysis step is maintained, based on the plurality of analysis results outputted by the first analysis step and an adopted result of the second analysis step.

According to the invention described above, the deletion rule for deleting one or more unnecessary analysis results of the first analysis unit such that even if the one or more unnecessary analysis results are deleted from the plurality of analysis results outputted by the first analysis unit, the analysis result adopted by the second analysis unit is maintained is generated on the basis of the plurality of analysis results outputted by the first analysis unit and an adopted result of the second analysis unit.

It is therefore possible to prevent an analysis result, which is required by the second analysis unit in order to adopt a correct analysis result, from being deleted from the analysis results of the first analysis unit which have not been adopted by the second analysis unit. Consequently, it is possible to remove only unnecessary candidates (analysis results) which do not change the final analysis result.

Also, a language processing device according to the present invention includes a first analysis unit that performs a predetermined analysis on a natural language sentence including a polysemic word and other words to output a plurality of analysis results for the natural language sentence in accordance with a plurality of meanings possessed by the polysemic word, a second analysis unit that performs a particular analysis on the plurality of analysis results outputted by the first analysis unit to adopt one analysis result of the plurality of analysis results, a storage unit that stores determination information, for each combination of one meaning of the polysemic word with information related to the other words, that indicates whether or not the combination is adopted, an adoption information generation unit that generates adoption information, for each combination of the meaning of the polysemic word within each analysis result outputted by the first analysis unit with the information related to the other words, that indicates whether or not the combination is adopted by the second analysis unit, based on the plurality of analysis results outputted by the first analysis unit and an adopted result by the second analysis unit, and a rule generation unit that, when the combination, which is determined as "not adopted" in the adoption information generated by the adoption information generation unit, corresponds to the determination information that indicates "adopted" in the storage unit, changes the adoption information to "adopted" and subsequently generates a deletion rule for deleting one or more unnecessary analysis results from the plurality of analysis results, based on the adoption information which is changed and the adoption information which is not changed.

Also, a language processing method according to the present invention is a language processing method performed by a language processing device including a storage unit which stores determination information, for each combination of one meaning of a polysemic word with information related to other words, that indicates whether or not the combination is adopted, and the method includes a first analysis step of performing a predetermined analysis on a natural language sentence including the polysemic word and other words to output a plurality of analysis results for the natural language sentence in accordance with a plurality of meanings possessed by the polysemic word, a second analysis step of performing a particular analysis on the plurality of analysis results to adopt one analysis result of the plurality of analysis results, an adoption information generation step of generating adoption information, for each combination of the meaning of the polysemic word within each analysis result outputted by the first analysis step with the information related to the other words, that indicates whether or not the combination is adopted by the second analysis step, based on the plurality of analysis results outputted by the first analysis step and an adopted result of the second analysis step, and a rule generation step of, when the combination, which is determined as "not adopted" in the adoption information, corresponds to the determination information that indicates "adopted" in the storage unit, changing the adoption information to "adopted" and subsequently generating a deletion rule for deleting one or more unnecessary analysis results from the plurality of analysis results, based on the adoption information which is changed and the adoption information which is not changed.

According to the invention described above, when a combination within analysis results which is not adopted by the second analysis unit corresponds to determination information that indicates "adopted" in the storage unit, the adoption information of the combination is changed to "adopted," and subsequently, the deletion rule for deleting one or more unnecessary analysis results from the plurality of analysis results of the first analysis unit is generated on the basis of the adoption information which has been changed and the adoption information which has not been changed.

It is therefore possible to prevent an analysis result, which is required by the second analysis unit in order to adopt a correct analysis result, from being deleted from the analysis results of the first analysis unit which have not been adopted by the second analysis unit. Accordingly, it is possible to remove only unnecessary candidates (analysis results) which do not change the final analysis result.

In this regard, the combination of the meaning of the polysemic word with information related to the other words is preferably, a combination of one of the surface strings, an original form, a word class, and a conjugation or a combination thereof of the polysemic word with words therearound.

Also, the first analysis unit preferably analyzes the natural language sentence in accordance with a rule-base scheme for performing an analysis based on a previously determined predetermined rule.

According to the invention described above, an analysis scheme in the first analysis unit is a rule-based scheme which differs in analysis scheme from a statistics based analysis which is based on a statistical model that is used to create the deletion rule. Therefore, the deletion processing based on the deletion rule is more likely to function effectively.

Also, a language processing device according to the present invention includes a knowledge base storage unit that stores a deletion rule generated by the language processing device described above, a first analysis unit that performs a predetermined analysis on a natural language sentence including a polysemic word and other words to output a plurality of analysis results for the natural language sentence in accordance with a plurality of meanings possessed by the polysemic word, an ambiguity deletion unit that deletes one or more unnecessary analysis results from the plurality of analysis results outputted by the first analysis unit based on the deletion rule stored in the knowledge base storage unit, and a second analysis unit that performs a particular analysis on the plurality of analysis results, from which the one or more unnecessary analysis results have been deleted by the ambiguity deletion unit, to adopt one analysis result from among plurality of analysis results.

Also, a language processing method according to the present invention is a language processing method performed by a language processing device including a knowledge base storage unit that stores a deletion rule generated by the language processing device, and the method includes a first analysis step of performing a predetermined analysis on a natural language sentence including a polysemic word and other words to output a plurality of analysis results for the natural language sentence in accordance with a plurality of meanings possessed by the polysemic word, an ambiguity deletion step of deleting one or more unnecessary analysis results from the plurality of analysis results based on the deletion rule stored in the knowledge base storage unit, and a second analysis step of performing a particular analysis on the plurality of analysis results, from which the one or more unnecessary analysis results have been deleted, to adopt one analysis result from among plurality of analysis results.

According to the invention described above, since an analysis result, which is required by the second analysis unit in order to adopt a correct analysis result, is not deleted from the analysis results of the first analysis unit which have not been adopted by the second analysis unit, it possible to delete only unnecessary analysis results. It is therefore possible to delete the processing of the second analysis unit while maintaining the accuracy of the analysis result of the second analysis unit.

Also, a language processing program according to the present invention is a language processing program for causing a computer to execute language processing, and the program causes the computer to execute language processing which includes first analysis processing for performing a predetermined analysis on a natural language sentence including a polysemic word and other words to output a plurality of analysis results for the natural language sentence in accordance with a plurality of meanings possessed by the polysemic word, second analysis processing for performing a particular analysis on the plurality of analysis results to adopt one analysis result from the plurality of analysis results, and generation processing for generating a deletion rule for deleting one or more unnecessary analysis results of the first analysis processing such that even if the one or more unnecessary analysis results are deleted from the plurality of analysis results, the analysis result adopted by the second analysis processing is maintained, based on the plurality of analysis results outputted by the first analysis processing and an adopted result of the second analysis processing.

Also, a language processing program according to the present invention is a language processing program for causing a computer to execute language processing, the computer being connected to a storage unit which stores determination information, for each combination of one meaning of a polysemic word with information related to other words, that indicates whether or not the combination is adopted, and the program causes the computer to execute language processing which includes first analysis processing for performing a predetermined analysis on a natural language sentence including a polysemic word and other words to output a plurality of analysis results for the natural language sentence in accordance with a plurality of meanings possessed by the polysemic word, second analysis processing for performing a particular analysis on the plurality of analysis results to adopt one analysis result of the plurality of analysis results, adoption information generation processing for generating adoption information, for each combination of the meaning of the polysemic word within each analysis result outputted by the first analysis processing with the information related to the other words, that indicates whether or not the combination is adopted by the second analysis processing, based on the plurality of analysis results outputted by the first analysis processing and an adopted result of the second analysis processing, and rule generation processing for, when the combination, which is determined as "not adopted" in the adoption information, corresponds to the determination information that indicates "adopted" in the storage unit, changing the adoption information to "adopted" and subsequently generating a deletion rule for deleting one or more unnecessary analysis results from the plurality of analysis results, based on the adoption information which is changed and the adoption information which is not changed.

Also, a language processing program according to the present invention is a language processing program for causing a computer to execute language processing, the computer being connected to a knowledge base storage unit that stores a deletion rule generated by the language processing device, and the program causes the computer to execute language processing which includes first analysis processing for performing a predetermined analysis on a natural language sentence including a polysemic word and other words to output a plurality of analysis results for the natural language sentence in accordance with a plurality of meanings possessed by the polysemic word, ambiguity deletion processing for deleting one or more unnecessary analysis results from the plurality of analysis results based on the deletion rule stored in the knowledge base storage unit, and second analysis processing for performing a particular analysis on the plurality of analysis results, from which the one or more unnecessary analysis results have been deleted, to adopt one analysis result from the plurality of analysis results.

According to the invention described above, the computer can be caused to execute the language processing methods.

Effect of the Invention

According to the present invention, it is possible to remove only unnecessary candidates which do not change a final analysis result, and analysis processing can be performed at higher speeds without changing an analysis result by removing only the unnecessary candidates.

BRIEF DESCRIPTION OF THE DRAWINGS

FIG. 3A is an explanatory diagram showing a specific example of a contradiction detection example stored in appearance example storage unit 31.

FIG. 3C is an explanatory diagram showing a specific example of an example derived from the analysis result of FIG. 3B.

DESCRIPTION OF REFERENCE NUMERALS

1 Input Device
2 Data Processing Device
21 First Analysis Unit
22 Ambiguity Deletion Unit
23 Second Analysis Unit
24 Unnecessary Ambiguity Learning Unit
241 Example Extraction Unit
242 Contradiction Adjustment Unit
243 Knowledge Base Configuration Unit
244 Rule Generation Unit
3 Storage Device
31 Appearance Example Storage Unit
32 Knowledge Base Storage Unit
4 Output Device
5 Program Storage Unit

BEST MODE FOR CARRYING OUT THE INVENTION

Next, the best mode for carrying out the invention will be described in detail with reference to the drawings.

Figure 1:
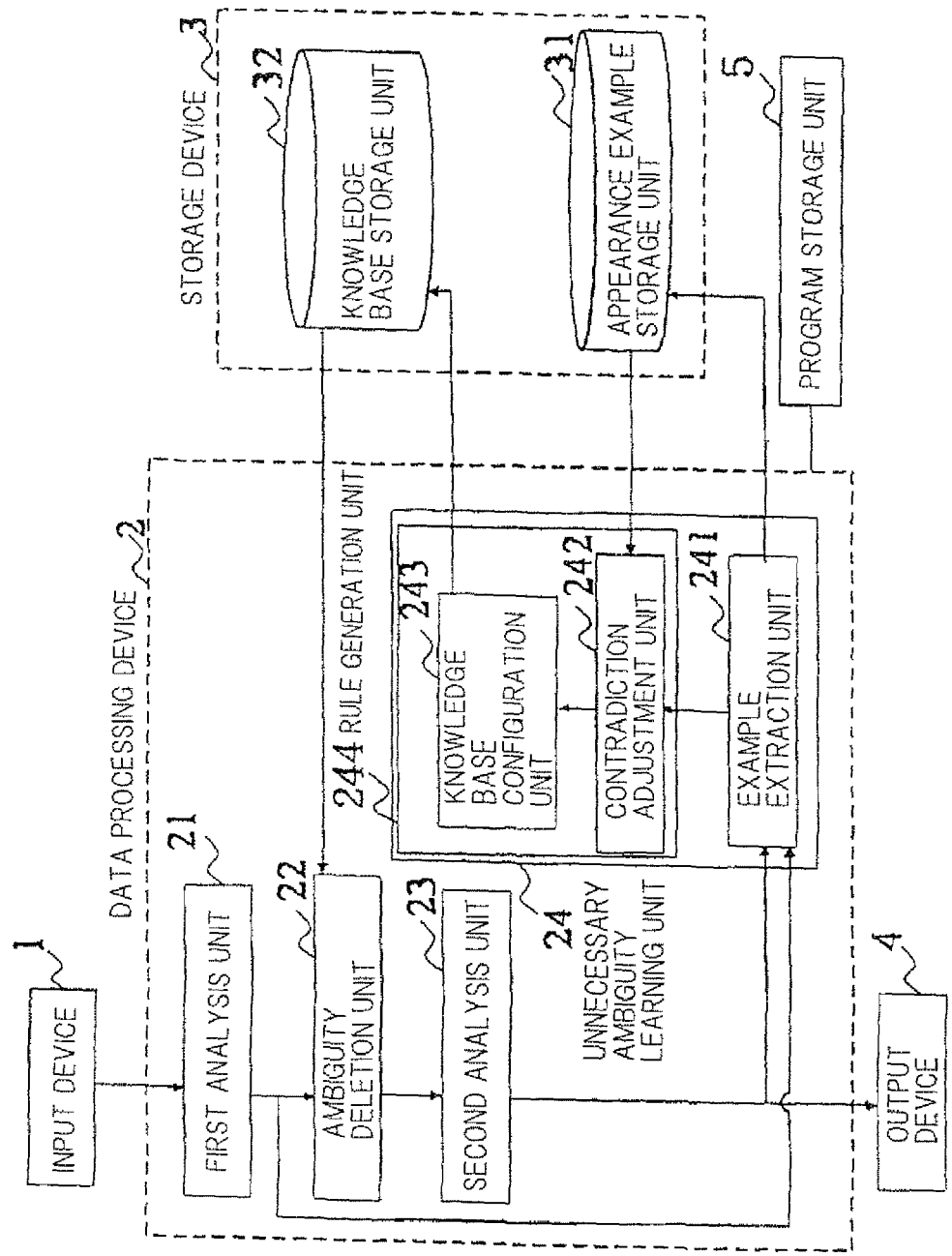
FIG. 1 is a block diagram showing the configuration of a first exemplary embodiment of the present invention.

FIG. 1 is a block diagram showing the configuration of a first exemplary embodiment of the present invention.

In FIG. 1, a language processing device of the first exemplary embodiment includes input device 1 such as a keyboard, data processing device (computer) 2 which operates under the control of a program, storage device 3 for storing information, output device 4 such as a display device or a printing device and the like, and program storage unit (computer readable recording medium) 5 for storing a program which defines the operation of data processing device 2.

Storage device 3 comprises appearance example storage unit 31 and knowledge base storage unit 32.

Appearance example storage unit 31 has examples for contradiction detection previously stored therein.

The examples for contradiction detection are created preferably by syntactically analyzing a large amount of sentences by first analysis unit 21 and second analysis unit 23, and extracting data in the same format as an example given to knowledge base configuration unit 243 from each result thereof. The performance of the contradiction detection becomes higher as a larger number of examples are created here.

In each example, a combination of one meaning of a polysemic word with information related to other words is associated with determination information which represents whether or not the combination is adopted.

For reference, a polysemic word is defined as a grammatical element such as a word or a phrase and the like, which has grammatical functions such as a plurality of meanings or a plurality of word classes and the like. On the other hand, the information related to other words refers to information related to a word that is different from the polysemic word (for example, a word class of a word immediately before a polysemic word).

Knowledge base storage unit 32 stores a knowledge base (for example, deletion rule) created by knowledge base configuration unit 243.

Data processing device 2 comprises first analysis unit 21, ambiguity deletion unit 22, second analysis unit 23, example extraction unit 241, contradiction adjustment unit 242, and knowledge base configuration unit 243. In this regard, contradiction adjustment unit 242 and knowledge base configuration unit 243 make up rule generation unit 244. Also, example extraction unit 241, contradiction adjustment unit 242, knowledge base configuration unit 243, and appearance example storage unit 31 make up a generation unit.

Data processing device 2 reads a program, for example, stored in program storage unit 5, and executes the program to implement first analysis unit 21, ambiguity deletion unit 22, second analysis unit 23, example extraction unit 241, contradiction adjustment unit 242, and knowledge base configuration unit 243.

In this regard, first analysis unit 21, ambiguity deletion unit 22, second analysis unit 23, example extraction unit 241, contradiction adjustment unit 242, and knowledge base configuration unit 243 may be configured in hardware.

These components generally operate in the following manner.

First analysis unit 21 performs syntactic analysis processing up to an intermediate phase. When the syntactic analysis processing comprises n phases X1-Xn, first analysis unit 21 performs analyses in X1-Xm (m≠n).

Also, first analysis unit 21 performs predetermined analyses (analyses in X1-Xm (m≠n)) on a natural language sentence including a polysemic word and other words, and outputs a plurality of analysis results for the natural language sentence in accordance with a plurality of meanings possessed by the polysemic word.

Ambiguity deletion unit 22 removes interpretation results determined as "not adopted" based on the knowledge base stored in knowledge base storage unit 32 from the plurality of analysis results that are outputted by first analysis unit 21. In this regard, ambiguity deletion unit 22 provides a plurality of analysis results outputted by first analysis unit 21 to second analysis unit 23 when it is prohibited from operating.

Second analysis unit 23 performs analysis processing at phases subsequent to the analysis processing performed by first analysis unit 21, based on the output of ambiguity deletion unit 22.

Specifically, second analysis unit 23 performs particular analyses (analyses of Xm+1 to Xn) on the output of ambiguity deletion unit 22 (for example, a plurality of analysis results outputted by first analysis unit 21) to adopt one analysis result from among plurality of analysis results.

Example extraction unit 241 creates an example for each analysis result of first analysis unit 21 in accordance with adoption information that indicates adoption or not in the output of second analysis unit 23, and information that is related to an ambiguity in each analysis result that is used to configure a knowledge base in knowledge base configuration unit 243, i.e., an identity set.

Specifically, example extraction unit 241, which is an example of an adoption information generation unit, extracts a combination of a meaning of a polysemic word with information related to other words (including an identity set), i.e., an example, from each analysis result in accordance with a plurality of analysis results outputted by first analysis unit 21 and the adopted result of second analysis unit 23.

Further, example extraction unit 241 generates adoption information for each example, which indicates whether or not the example has been adopted by second analysis unit 23, in accordance with the plurality of analysis results outputted by first analysis unit 21 and the adoption result of second analysis unit 23, and appends the adoption information to that example.

Contradiction adjustment unit 242 matches a large amount of examples stored in appearance example storage unit 31 against a example extracted by example extraction unit 241 to confirm whether or not a contradictory example exists. Contradiction adjustment unit 242 modifies the adoption information for an example extracted by example extraction unit 241 only in a direction of "not adopted" to "adopted" when a contradictory example exists.

Knowledge base configuration unit 243 creates a knowledge base (for example, a deletion rule for deleting one or more unnecessary analysis results from a plurality of analysis results of first analysis unit 21) for ambiguity deletion, in accordance with examples outputted by contradiction adjustment unit 242, and stores the knowledge base in knowledge base storage unit 32.

Figure 2:
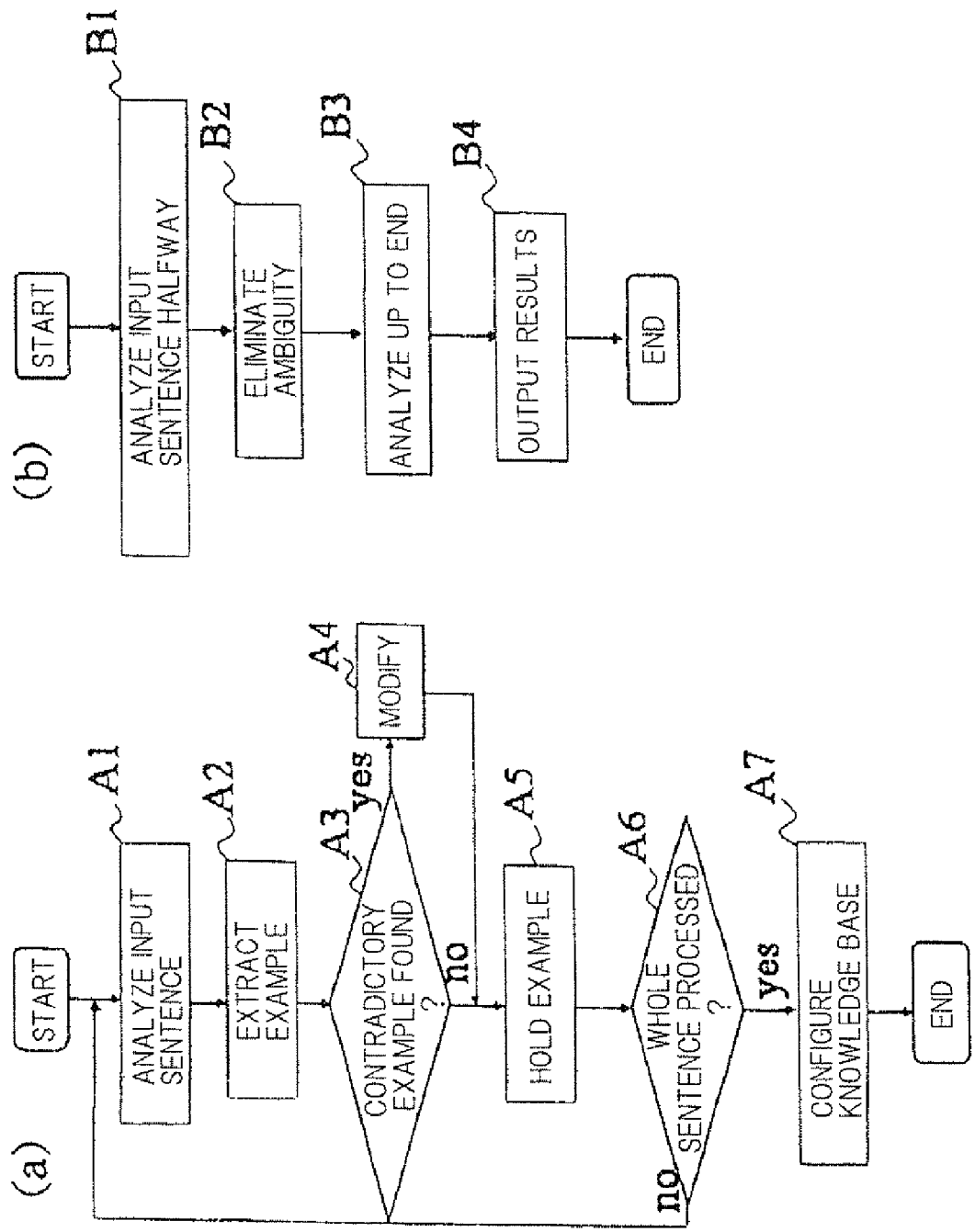
FIG. 2 is a flow chart showing the operation of a language processing device shown in FIG. 1.

FIG. 2 is a flow chart for describing the operation of the language processing device shown in FIG. 1. In the following, the overall operation of the language processing device shown in FIG. 1 will be described in detail with reference to FIGS. 1 and 2.

First, a description will be given of operations for learning a knowledge base (for example, operations when a deletion rule for deleting one or more unnecessary analysis results from a plurality of analysis results of first analysis unit 21 is created).

An input character string applied from input device 1 is syntactically analyzed by first analysis unit 21 and second analysis unit 22 (step A1). In this regard, the input character string includes a polysemic word and other words.

In this exemplary embodiment, first analysis unit 21 performs morphological analysis processing for dividing the input sentence into words and giving a word class, while second analysis unit 23 performs inter-relationship determination processing for determining an inter-relationship among the words. In this event, ambiguity deletion unit 22 may not delete an ambiguity.

Next, example extraction unit 241 receives a plurality of analysis results outputted by first analysis unit 21 and an adopted result of second analysis unit 23, and extracts an example from information resulting from a gather of them. In this regard, an example includes a combination of a meaning of the polysemic word with information related to the other words (including an identity set) within each analysis result, and adoption Information that indicates whether or not the combination has been adopted by second analysis unit 23 (step A2).

In this exemplary embodiment, the analysis results outputted by first analysis unit 21 have an ambiguity in the division of words and the word class. Also, in this exemplary embodiment, the identity set includes a surface string, a word class, and a conjugation of a polysemic word (word) having an ambiguity and words immediately before and after the polysemic word (word).

Next, contradiction adjustment unit 242 matches examples stored in appearance example storage unit 31 against the example extracted by example extraction unit 241 to confirm whether or not a contradictory example exists (step A3).

The contradiction indicates that an example, which has the same identity set as and different adoption information from the example extracted by example extraction unit 241, exists in appearance example storage unit 31.

Contradiction adjustment unit 242 modifies the adoption information of the example extracted by example extraction unit 241 only in a direction from "not adopted" to "adopted" when a contradictory example exists (step A4).

Contradiction adjustment unit 242 performs this modification, thereby making it more difficult to create a model which erroneously deletes an analysis result which cannot be essentially deleted because of ambiguity, resulting in the existence of a contradictory example in learning data when deleted.

The example, which is the output of contradiction adjustment unit 242, is temporarily stored in memory within knowledge base configuration unit 243 (step A5).

Here, first analysis unit 21 confirms whether or not a character string available for input remains (step A6).

When a character string available for input remains, processing from step A1 to step A5 is repeated with regard to the remaining input.

When no character string available for input remains, knowledge base configuration unit 243 creates a knowledge base for ambiguity deletion in accordance with examples derived as the output of contradiction adjustment unit 242, and stores the knowledge base in knowledge base storage unit 32.

As a knowledge base creation method, this exemplary embodiment uses a statistical model creation method using a learner such as a decision tree, a maximum entropy method, a support vector machine method and the like.

In the following, a description will be given of other variations of this exemplary embodiment.

First analysis unit 21 and second analysis unit 23 can be modified as appropriate in any combination in which the ambiguity of the analysis results of first analysis unit 21 is deleted by second analysis unit 23.

For example, first analysis unit 21 may perform a morphological analysis and paragraph formalization processing, while second analysis unit 23 may perform an inter-relationship analysis between paragraphs.

Also, this exemplary embodiment uses syntactic analysis processing as overall language analysis processing which is a combination of first analysis unit 21 and second analysis unit 23. However, overall language analysis processing which is a combination of first analysis unit 21 and second analysis unit 23 can be otherwise modified as appropriate as long as it is language analysis processing which is comprised of a plurality of phases and in which an ambiguity in an intermediate phase is eliminated by a latter phase, such as morphological analysis processing, semantic analysis processing, machine translation processing, speech synthesis processing, and speech recognition processing and the like.

Examples for contradiction detection stored in appearance example storage unit 31 may be manually created. Alternatively, this example may not be previously created, but the output of contradiction adjustment unit 242 in the course of language processing may be stored in appearance example storage unit 31 as an example. Further, on top of previously stored examples for contradiction detection, the output of contradiction adjustment unit 242 may be added to the examples.

The number and direction of grammatical elements (other words) such as words and paragraphs, referenced as an identity set used to configure a knowledge base can be changed as appropriate. For example, only one element immediately before a polysemic word may be referenced, or two elements immediately before and one element immediately after may be referenced.

Also, information referenced within grammatical elements (information related to other words) may be any one of the following: a surface string, a word class, a conjugation or a combination thereof, or other information as long as the information relates to the grammatical elements.

Also, information referenced by each grammatical element may not be unified in total. For example, a change may be added such as a functional word references the surface string, while an independent word does not reference the surface string.

Also, step A6 may not be performed, but the knowledge base may be updated at step A7 every one input.

As a knowledge base creation method, the output of contradiction adjustment unit 242 may be stored since it is in the knowledge base.

Next, a description will be given of operations when a syntactic analysis is performed using the knowledge base within knowledge base storage unit 32.

First analysis unit 21 analyzes a character string inputted from input device 1 up to an intermediate phase in syntactic analysis processing (step B1). In this regard, if a polysemic word is included in the character string, first analysis unit 21 outputs a plurality of analysis results for the character string in accordance with a plurality of meanings possessed by the polysemic word.

Next, ambiguity deletion unit 22 determines adoption or not of each analysis result with reference to information related to meanings of the polysemic word and the other words within each analysis result of first analysis unit 21, and the knowledge base within knowledge base storage unit 32, and deletes analysis results determined as "not adopted" from these analysis results (step B2).

Second analysis unit 23 performs analysis at remaining phases using the analysis results left by ambiguity deletion unit 22 (step B3).

Second analysis unit 23 outputs a finally derived analysis result, as a result of the analyses, to output device 4 (step B4).

Next, effects of this exemplary embodiment will be described.

In this exemplary embodiment, the generation unit made up of example extraction unit 241, contradiction adjustment unit 242, knowledge base configuration unit 243, and appearance example storage unit 31 generates a deletion rule for deleting one or more unnecessary analysis results of first analysis unit 21 in such a manner that an analysis result adopted by second analysis unit 23 is maintained even if the one or more unnecessary analysis results are deleted from a plurality of analysis results outputted by first analysis unit 21, based on the plurality of analysis results outputted by first analysis unit 21 and an adopted result of second analysis unit 24.

Thus, it is possible to prevent an analysis result, which is required by second analysis unit 24 in order to adopt a correct analysis result, from being deleted from the analysis results of first analysis unit 21 which were not adopted by second analysis unit 24. Consequently, it is possible to remove only unnecessary candidates (analysis results) which do not change a final analysis result.

Also, in this exemplary embodiment, when an example (contradictory example) that is different from an example extracted by example extraction unit 241 is stored in appearance example storage unit 21, contradiction adjustment unit 242 modifies the adoption information of the example extracted by example extraction unit 241 from "not adopted" to "adopted." In this way, ambiguity deletion unit 22 using the knowledge base created on the basis of the output of contradiction adjustment unit 242 is less likely to perform erroneous search result deletion.

Accordingly, the analysis result is advantageously not changed from the case where the ambiguity is not deleted, even if the ambiguity is deleted to speed the analysis processing.

Also, while two methods are roughly contemplated for implementing first analysis unit 21, i.e., a statistics based analysis based on a statistical model, and a rule based analysis (rule based scheme) for performing an analysis based on a manually created rule. This exemplary embodiment is more advantageous to an analysis unit based on the rule based analysis.

This is attributable to the following reason.

First analysis unit 21 independently deletes the ambiguity in many cases, while ambiguity deletion unit 22 deletes an ambiguity (analysis result) which cannot be deleted by first analysis unit 21.

Assuming that a similar ambiguity (analysis result) can only be deleted from similar information, it can be said that a deletion effect becomes larger as first analysis unit 21 and ambiguity deletion unit 22 refer to information which is less overlapped.

While first analysis unit 21 is performing a statistics based analysis, if a statistical model which bases this analysis and a statistical model referenced by ambiguity deletion unit 22 are similar models, referenced information largely overlaps, resulting in a deleted ambiguity deletion effect. Conversely, an analysis rule in a rule-based analysis often has different properties from those of a statistical model, so that less referenced information overlaps, resulting in an increased ambiguity deletion effect.

EXAMPLES

Next, the operation of this exemplary embodiment will be described using specific examples.

In a first example, first analysis unit 21 performs morphological analysis processing which divides an input sentence into words and gives a word class, while second analysis unit 23 performs inter-relationship determination processing for determining inter-relationships between words.

Also, information referenced by example extraction unit 241 includes a surface string (but only for a word having an ambiguity (polysemic word) and functional words) and a word class of the word having an ambiguity (polysemic word) and words immediately before and after the ambiguity (polysemic word).

Also, a method of creating a knowledge base in knowledge base configuration unit 243 is a support vector machine method (hereinafter called the SVM method).

Also, appearance example storage unit 31 stores examples which are derived by supplying example extraction unit 241 with results of analyzing a large amount of sentences in first analysis unit 21 and second analysis unit 23.

FIG. 3A is an explanatory diagram showing a specific example of examples stored in appearance example storage unit 31. For example, the fourth example from the top in FIG. 3A can be derived from an input sentence "Mondai ga tokeru to shiawase ni nareru" (You can feel happy when you solves a problem).

First, operations will be described during knowledge base learning.

Assume that three expressions exist in an input sentence: "Mondai wo tokeru to musume ga iu" (My daughter says that she can solve the problem) (Expression 1), "Yuki ga tokeru to haru ga kuru" (Snow thaws with the advent of spring) (Expression 2), and "Kono mondai ga tokeru to hanashi ga susumu" (If this difficult problem is solved, the conversation will go further) (Expression 3).

The word "tokeru" has two meanings of a verb "(thing) thaw" and a possible verb which is a possible form of "solve (a problem)" thus the word "tokeru" has ambiguity.

Also, the word "to" has two meanings of "reference postpositional word functioning as an auxiliary to a main word" and "connection postpositional word functioning as an auxiliary to a main word", so that the word "to" has ambiguity.

Figure 3B:
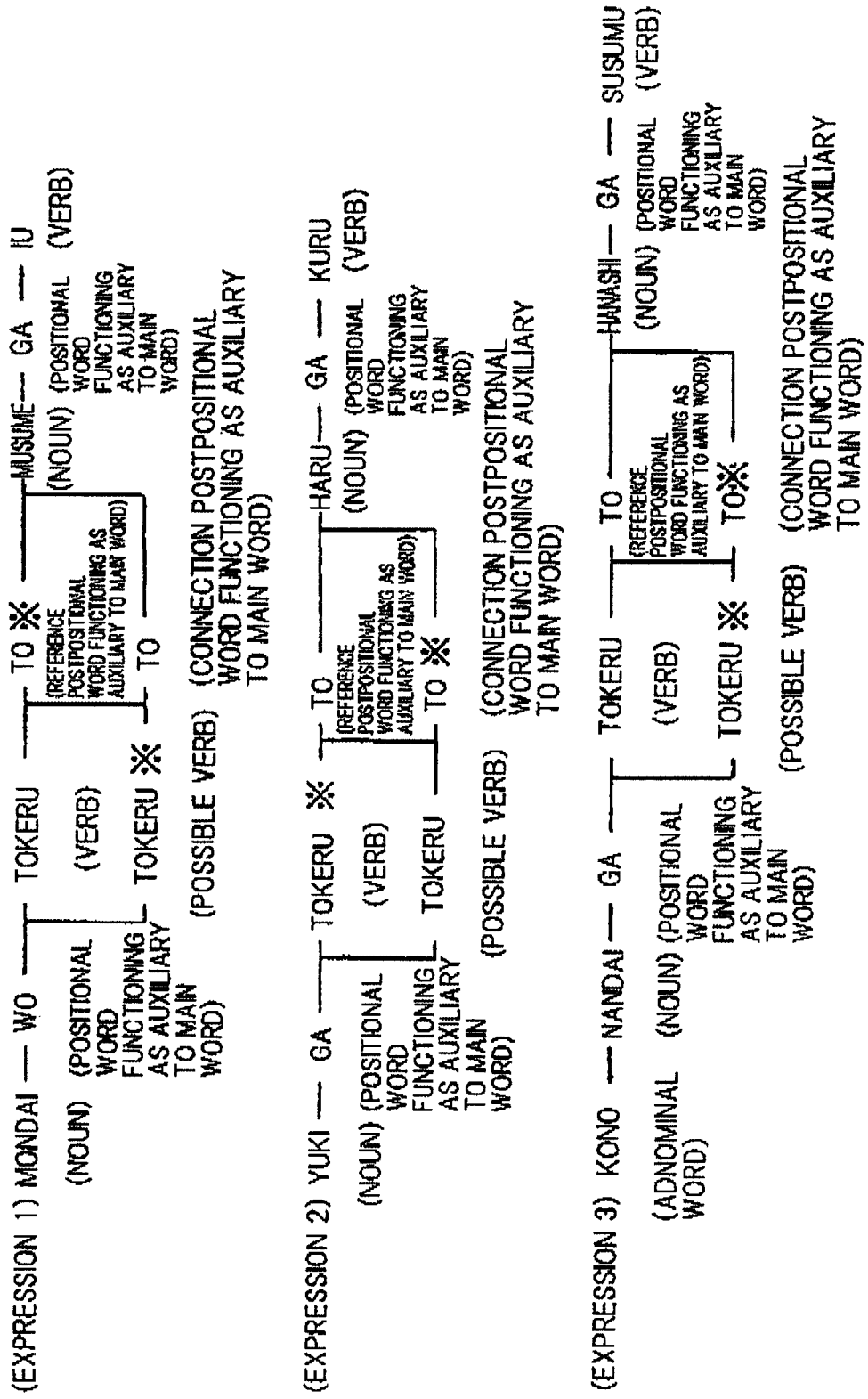
FIG. 3B is an explanatory diagram showing a specific example of a morpheme analysis result having an ambiguity.

Accordingly, a morphological analysis of Expressions 1-3 by first analysis unit 21 results in a structure having a plurality of morphological analysis results having ambiguity, as shown in FIG. 3B.

As this structure having an ambiguity is supplied to second analysis unit 23, the ambiguity of the morphological analysis results of first analysis unit 21 is eliminated in course of the analysis of second analysis unit 23. Symbol ✕ in FIG. 3B indicates a morphological analysis result adopted by second analysis unit 23 as a result of the analysis.

Next, unnecessary ambiguity learning unit 24 creates an example for learning a knowledge base from the output of first analysis unit 21 and the adoption result of second analysis unit 23.

The creation of an example in this Example refers to the pairing of the surface string (but only for a word having an ambiguity and functional words), information on the word class, and the adoption information in second analysis unit 23 for each analysis result of the word having an ambiguity (polysemic word) and words immediately before and after that word, with regard to each morphological analysis result of the first analysis unit.

The adoption information is either "adopted" or "not adopted" and takes a binary value.

In the following, an example is shown, where an example is created from the ambiguity of "tokeru" (thaw) in Expression 1 by unnecessary ambiguity learning unit 24.

Referring to (Expression 1) in FIG. 3B, the surface string of a word having an ambiguity (polysemic word) is "tokeru", the word class of which is a "verb", and the surface string of the preceding word is "wo," the word class of which is a postpositional word functioning as an auxiliary to a main word, while the surface string of the subsequent word is "to", the word class of which is a "reference postpositional word functioning as an auxiliary to a main word" or a "connection postpositional word functioning as an auxiliary to a main word," and since the adoption information on them is "not adopted," the following two examples are derived.

Example 1

[Preceding Word (Surface string: wo/Word Class: Postpositional Word Functioning as Auxiliary to Main Word), Word Having Ambiguity (Surface string: tokeru/Word Class: Verb), Subsequent Word (Surface string: to /Word Class: Reference Postpositional Word Functioning as Auxiliary to Main Word)]→Not Adopted Example 2

[Preceding Word (Surface string: wo/Word Class: Postpositional Word Functioning as Auxiliary to Main Word), Word Having Ambiguity (Surface string: tokeru/Word Class: Verb), Subsequent Word (Surface string: to /Word Class: Connection Postpositional Word Functioning as Auxiliary to Main Word)]→Not Adopted In order to delete the amount of calculations during learning, the number of examples is preferably deleted to the smallest possible number.

Therefore, with regard to words (other words) that are different from the word having an ambiguity, a word adopted by second analysis unit 23 may be used as much as possible.

Specifically, since a candidate (interpretation example) for "to" adopted in Expression 1 is a "reference postpositional word functioning as an auxiliary to a main word," Example 2 of the "connection postpositional word functioning as an auxiliary to a main word" of a candidate (interpretation example) not adopted may not be used in the learning.

FIG. 3C is an explanatory diagram showing the result of creating examples for all the morphological analysis results of Expressions 1-3 in this way.

Next, unnecessary ambiguity learning unit 24 (contradiction adjustment unit 242) compares the derived examples with an example for contradiction detection stored in appearance example storage unit 31 to confirm whether or not there is a contradiction.

For example, when the fourth example from the top in FIG. 3C is compared with the fourth example for contradiction detection from the top in FIG. 3A, they have the same identity set but different adoption information, so that it can be said to be a contradictory example.

In this event, contradiction adjustment unit 242 modifies the adoption information of the derived case from "not adopted" to "adopted."

In this regard, when a modification is made from "adopted" to "not adopted," a model for unitarily deleting ambiguities which cannot be essentially deleted is created in the subsequent knowledge base configuration, so that this modification is not made in this Example.

In this regard, for another example of Expression 1 which requires the modification from "not adopted" to "adopted," a mark "(contradiction)" is given to an item of employment information in FIG. 3C.

Contradiction adjustment unit 242, upon completion of the modification, provides knowledge base configuration unit 243 with a modified example and an unmodified example.

Finally, knowledge base configuration unit 243 learns an ambiguity elimination model using SVM from the examples accepted from contradiction adjustment unit 242.

In this event, knowledge base configuration unit 243 performs binary classification learning with an identify set of each example used as an input and the adoption information as a target class.

A high accuracy can be achieved by using a third-order polynomial function in a kernel function of SVM.

A classifier, such as SVM, a maximum entropy method, a decision tree, attempts to learn boundaries with which input examples are classified in accordance with classes indicated in the examples.

Knowledge base configuration unit 243 generally configures a model (knowledge base), which determines a morphological analysis result of verb "tokeru" (thaw) preceded by a postpositional word functioning as an auxiliary to a main word "wo" as "not adopted" and determines a plurality of morphological analysis results (ambiguities) related to the word "to" as "adopted" in any context, from examples of this Example, and stores this in knowledge base storage unit 32.

Next, a description will be given of operations when a syntactic analysis is performed using the configured knowledge base.

Assuming that Expressions 1-3 are inputted, first analysis unit 21 outputs morphological analysis results having ambiguities shown in FIG. 3B, i.e., a plurality of morphological analysis results, in a manner similar to that during learning.

Subsequently, ambiguity deletion unit 22 creates an identity set for each morphological analysis result, and removes a morphological analysis result corresponding to a composition set thereof if the identity set is determined as "not adopted" by a classifier stored in the knowledge base.

For example, the following identity set is derived from the analysis result of the verb "tokeru" (thaw) in Expression 1 in a procedure similar to that of the Example during learning. However, since the ambiguity of the word "to" has not been determined upon analysis in first analysis unit 21, the number is two.

Identity Set 1: [Preceding Word (Surface string: wo/Word Class: Postpositional Word Functioning as Auxiliary to Main Word), Word Having Ambiguity (Surface string: tokeru/Word Class: Verb), Subsequent Word (Surface string: to /Word Class: Reference Postpositional Word Functioning as Auxiliary to Main Word)]

Identity Set 2: [Preceding Word (Surface string: wo/Word Class: Postpositional Word Functioning as Auxiliary to Main Word), Word Having Ambiguity (Surface string: tokeru/Word Class: Verb), Subsequent Word (Surface string: to /Word Class: Connection Postpositional Word Functioning as Auxiliary to Main Word)]

Ambiguity deletion unit 22 determines whether or not each identity set is adopted by the model within knowledge base storage unit 32. In this event, ambiguity deletion unit 22 determines the identity set as "not adopted" because in both identity sets 1, 2, the word having an ambiguity is verb "tokeru" (thaw), and a postpositional word functioning as an auxiliary to a main word "wo" exists immediate before that.

As a result, candidates for verb "tokeru" (thaw) are determined as unnecessary and removed.

On the other hand, the model learned this time does not determine a candidate for the possible verb "tokeru" (solve) as "not adopted" when there is no postpositional word functioning as an auxiliary to a main word "wo" immediately before that, and does not determine a plurality of analysis results (ambiguities) for the word "to" as "not adopted," so that other morphological analysis results of Expressions 1-3 are not removed.

Finally, second analysis unit 23 performs analysis processing using the remaining morphological analysis results.

The morphological analysis result deleted by ambiguity deletion unit 22 is a morphological analysis result which is not adopted by second analysis unit 23 even if it is not removed by ambiguity deletion unit 22, so that the analysis result of second analysis unit 23 is not changed by the current deletion of ambiguity.

In the following, effects of the First Example will be described.

In this Example, since only a morphological analysis result, which does not change the analysis result of second analysis unit 23, is removed, the analysis result of second analysis unit 23 does not change, as compared with the analysis result of second analysis unit 23 when the ambiguity is not deleted.

On the other hand, since unnecessary morphological analysis results of first analysis unit 21 can be deleted for "tokeru," second analysis unit 23 improves in analysis speed, resulting in improvements in overall analysis speed.

Also, while the Example has been described giving an example of Japanese, the language under analysis is not limited to Japanese.

Next, a Second Example will be described.

The Second Example is substantially the same as the First Example in configuration except that knowledge base configuration unit 243 directly stores an example received from contradiction adjustment unit 242 in knowledge base storage unit 32.

First, operations during learning will be described.

As the aforementioned Expressions 1-3 are inputted, contradiction adjustment unit 242 gets the examples shown in FIG. 3C, in a manner similar to the First Example (note that an example that has been given a contradiction mark has adoption information modified to "adopted").

In this Example, knowledge base configuration unit 243 stores an example derived from contradiction adjustment unit 242 in knowledge base storage unit 32 as it is.

Next, a description will be given of operations when a syntactic analysis is performed using a derived knowledge base.

In a manner similar to the First Example, as Expressions 1-3 are inputted, first analysis unit 21 outputs a plurality of morphological analysis results having ambiguities, shown in FIG. 3B, and ambiguity deletion unit 22 gets an identity set similar to that of the First Example from each morphological analysis result. The ambiguity of verb "tokeru" (thaw) in Expression 1 is also similar to the First Example.

Subsequently, ambiguity deletion unit 22 determines whether or not each identity set is adopted in the following manner.

Ambiguity deletion unit 22 uses adoption information of the example existing in knowledge base storage unit 32 as a determination result, if an example which has an identity set that matches each derived identity set exists in knowledge base storage unit 32.

Specifically, if a pertinent example exists in knowledge base storage unit 32 and its adoption information is "adopted," ambiguity deletion unit 22 sets a determination result to "adopted" as well; if the adoption information of the pertinent example is "not adopted," it sets the determination result to "not adopted"; and if no pertinent example exists, it sets the determination result to "suspended."

Then, ambiguity deletion unit 22 determines each morphological analysis result in the following manner.

Ambiguity deletion unit 22 determines an associated morphological analysis result as "adopted" if even one identity set exists with the determination result set to "adopted," determines an associated morphological analysis result as "not adopted" if even one identity set exists with the determination result set to "not adopted" in the case where any identity set does not exist with the determination result set to "adopted," and otherwise determines the associated morphological analysis result as "adopted."

For example, using identity sets (identity sets 1, 2) of each morphological analysis result of the verb "tokeru" (thaw) as an example for description, since identity set 1 is the same as the identity set of the first example from the top in FIG. 3C, which has adoption information determined as "not adopted," identity set 1 is determined as "not adopted," whereas identity set 2 is determined as "suspended" because there isn't any example having the same identity set that exist in the knowledge base.

Accordingly, a morphological analysis result that represents the verb "tokeru" (thaw) is determined as "not adopted." As other morphological analysis results of Expressions 1-3 have been determined in a similar manner, they are all determined as "adopted".

Next, effects of the Second Example will be described.

In the Second Example, for determining each morphological analysis result as "not adopted," identity sets derived from the morphological analysis results must completely match identity sets within the knowledge base, so that higher speeds can be achieved without changing the analysis results by removing only unnecessary ambiguities, in a manner similar to the First Example, though the ambiguity deletion performance is inferior to the First Example.

It should be noted that the present invention can be applied to natural language processing applications which require syntactic analysis processing, such as a machine translation program for translating from a first natural language to a second natural language, and a text mining program for extracting a characteristic sequence of words from a sentence.

In the exemplary embodiments and in each Example described above, the illustrated configurations are mere examples, and the present invention is not limited to those configurations.

The invention claimed is:

1. A language processing device comprising:
a first analysis unit that performs a predetermined analysis on a natural language sentence including a polysemic word and other words to output a plurality of analysis results for the natural language sentence in accordance with a plurality of meanings possessed by the polysemic word;
a second analysis unit that performs a particular analysis on the plurality of analysis results outputted by said first analysis unit to adopt one analysis result from the plurality of analysis results;
a storage unit that stores determination information, for each combination of one meaning of said polysemic word with information related to the other words, the determination information indicating whether or not each combination is adopted;
an adoption information generation unit that generates adoption information for each combination of the meaning of the polysemic word within each analysis result outputted by said first analysis unit with the information related to the other words, the adoption information indicating whether or not each combination is adopted by said second analysis unit; and
a rule generation unit that, when a first said combination that is indicated to be "not adopted" in the adoption information corresponds to the determination information that indicates the first combination is "adopted", the rule generation unit changes the adoption information for the first combination to "adopted" and subsequently generates a deletion rule for deleting one or more unnecessary analysis results from the plurality of analysis results, the deletion rule being based on the updated adoption information.

2. The language processing device according to claim 1, wherein each said combination of the meaning of the polysemic word with information related to the other words includes one of the following: a surface string, a word class, a conjugation, and a combination thereof of the polysemic word with words therearound.

3. A language processing method performed by a language processing device embodied in a computer and including a storage unit which stores determination information, for each combination of one meaning of a polysemic word with information related to other words, that indicates whether or not the combination is adopted, said method comprising:
performing, in the computer, a predetermined analysis on a natural language sentence including a polysemic word and other words to output a plurality of analysis results for the natural language sentence in accordance with a plurality of meanings possessed by the polysemic word;
performing, in the computer, a particular analysis on the plurality of analysis results to adopt one analysis result from the plurality of analysis results;
generating, in the computer, adoption information, for each combination of the meaning of the polysemic word within each analysis result outputted by the step of performing the predetermined analysis with the information related to the other words, the adoption information indicating whether or not each combination is adopted by the step of performing the particular analysis; and
when a first said combination that is indicated to be "not adopted" in the adoption information corresponds to the determination information that indicates the first combination is "adopted", changing the adoption information for the first combination to "adopted" and subsequently generating a deletion rule for deleting one or more unnecessary analysis results from the plurality of analysis results, the deletion rule being based on the updated adoption information.

4. A non-transient computer readable recording medium in which a language processing program is embedded, said program causing a computer to execute language processing, said computer being connected to a storage unit which stores determination information, for each combination of a meaning of a polysemic word with information related to other words, that indicates whether or not the combination is adopted, said language processing comprising:

first analysis processing for performing a predetermined analysis on a natural language sentence including a polysemic word and other words to output a plurality of analysis results for the natural language sentence in accordance with a plurality of meanings possessed by the polysemic word;

second analysis processing for performing a particular analysis on the plurality of analysis results to adopt one analysis result from the plurality of analysis results;

adoption information generation processing for generating adoption information for each combination of the meaning of the polysemic word within each analysis result outputted by said first analysis processing step with the information related to the other words, the adoption information indicating whether or not the combination is adopted by said second analysis processing step; and rule generation processing for, when a first said combination is indicated to be "not adopted" in the adoption information corresponds to the determination information that indicates the first combination is "adopted", changing the adoption information for the first combination to "adopted" and subsequently generating a deletion rule for deleting one or more unnecessary analysis results from the plurality of analysis results, the deletion rule being based on the updated adoption information.

5. A language processing device comprising:

first analysis means for performing a predetermined analysis on a natural language sentence including a polysemic word and other words to output a plurality of analysis results for the natural language sentence in accordance with a plurality of meanings possessed by the polysemic word;

second analysis means for performing a particular analysis on the plurality of analysis results outputted by said first analysis means to adopt one analysis result from the plurality of analysis results;

storage means for storing determination information for each combination of one meaning of said polysemic word with information related to the other words, the determination information indicating whether or not the combination is adopted;

adoption information generation means for generating adoption information for each combination of the meaning of the polysemic word within each analysis result outputted by said first analysis means with the information related to the other words, the adoption information indicating whether or not the combination is adopted by said second analysis means; and rule generation means for, when a first said combination is indicated to be "not adopted" in the adoption information corresponds to the determination information that indicates that the first combination is "adopted", changing the adoption information for the first combination to "adopted" and subsequently generating a deletion rule for deleting one or more unnecessary analysis results from the plurality of analysis results, the deletion rule being based on the updated adoption information.

6. The language processing device of claim 5, further comprising knowledge base storage means for storing the deletion rule; and ambiguity deletion means for deleting one or more unnecessary analysis results from the plurality of analysis results outputted by said first analysis means based on the deletion rule stored in said knowledge base storage means.

* * * * *